United States Patent [19]

Schmidt et al.

[11] 4,081,725
[45] Mar. 28, 1978

[54] LIFT TRUCK CONTROL PROVIDING TIME DELAY IN OPERATION OF DIRECTIONAL CONTACTOR

[75] Inventors: Harvey E. Schmidt, Chicago Heights; Luke F. Henry, Homewood, both of Ill.; Howard G. Murphy, Greendale; Thomas P. Gilmore, Wauwatosa, both of Wis.

[73] Assignee: Allis-Chalmers Corporation, Milwaukee, Wis.

[21] Appl. No.: 645,325

[22] Filed: Dec. 30, 1975

[51] Int. Cl.² ........................... H02P 1/00; H02P 3/00
[52] U.S. Cl. .................................... 318/139; 318/447; 318/484
[58] Field of Search .................. 318/139, 447, 484; 317/13 R

[56] References Cited

U.S. PATENT DOCUMENTS

| | | | |
|---|---|---|---|
| 3,855,520 | 12/1974 | Stich | 318/139 |
| 3,902,105 | 8/1975 | Delaney et al. | 318/139 |

Primary Examiner—Robert K. Schaefer
Assistant Examiner—Eugene S. Indyk
Attorney, Agent, or Firm—Lee H. Kaiser

[57] ABSTRACT

A chopper motor-controller for regulating a lift truck traction motor incorporates means for detecting faults which may cause the truck to run out of control, such as the high speed bypass contacts which shunt the semiconductor power switch being welded closed, and for disabling the controller in response thereto and also has time delay means for preventing a directional contactor from closing in on a fault before the fault detecting means can operate to disable the controller. The disclosed controller may alternatively be connected to require the operator to relax the accelerator foot pedal when starting or changing direction or to permit change of direction while the foot pedal is depressed.

6 Claims, 2 Drawing Figures

LIFT TRUCK CONTROL PROVIDING TIME DELAY IN OPERATION OF DIRECTIONAL CONTACTOR

This invention relates to battery vehicle chopper motor-controllers using forced commutation and in particular to improved protection means for such chopper controllers.

BACKGROUND OF THE INVENTION

A known method of controlling the voltage to, and thus the speed of, a battery-driven DC series traction motor uses a rapid-acting switch, termed a chopper, in series with the motor. Such a chopper motor drive may accomplish motor speed control by pulse width modulation to vary the average power input to the DC motor, i.e., by rapidly switching a semiconductor power device, such as a silicon controlled rectifier (SCR) between the "on" state and the "off" state and controlling the percentage of "on" time, or alternatively such chopper drives may vary the frequency of constant width pulses to regulate the average power to the motor and thus control its speed. Many known motor-controller chopper circuits interrupt the current through the load current carrying SCR by forced commutation, the essence of which is to decrease the load current through the SCR to a value below the "hold-in" current for an interval greater than the "recovery period" of the SCR. Capacitor-type forced commutation choppers may charge a commutation capacitor in shunt to the load current carrying SCR during the "on" time and gate a commutation SCR in the shunt path to discharge the commutation capacitor in the reverse direction through the load current carrying SCR to cause it to commutate off.

Known chopper motor-controllers for DC traction motors often close a pair of full-speed bypass contacts in shunt to the load carrying SCR when the foot pedal accelerator is fully depressed in order to directly bypass the power switch and thus provide maximum vehicle speed, motor torque and efficiency. Known chopper controls may also utilize fault detecting means to remove power from the control under fault conditions which might cause the vehicle to move unexpectedly and injure personnel, for example, under such faults as failure to commutate the load current carrying SCR off or the full-speed bypass contacts being shorted. Such fault detector may, for example, trip a circuit breaker or turn off a solid state switch to disconnect one side of the battery from the control. One disadvantage of lift trucks having chopper motor-controller drives with such features is that, in the event of the full-speed bypass contacts being welded shut, the directional contactor may close upon starting the truck before the fault detector is actuated. Under such conditions the field winding of the motor is in effect connected directly across the battery so that excessive current flows through the directional contactor contacts and may weld them shut so the truck runs out of control. Another disadvantage of trucks having motor-controller chopper drives with such features is that they cannot safely incorporate desirable sequence-of-operation features, for example, requiring the truck operator to release the accelerator foot pedal before changing direction of truck travel rather than leaving the pedal depressed.

OBJECTS OF THE INVENTION

It is an object of the invention to provide an improved chopper drive for a lift truck traction motor which obviates the above defects and disadvantages of prior art apparatus and prevents the truck from running out of control on starting or changing direction in the event of a fault such as the full-speed bypass contacts being welded shut.

It is another object of the invention to provide such an improved chopper drive for a vehicle traction motor having known fault detection means and which prevents operation of a directional contactor until the fault detector means is activated and thus positively insures against the possibility of the truck lurching or running out of control upon starting or changing direction as a result of the directional contactor closing in upon a fault.

Still another object of the invention is to provide such an improved chopper motor-controller for a lift truck traction motor having known fault detection means and which may be arranged to require the operator to release the accelerator pedal when reversing direction of truck travel and still prevents the truck from running out of control under such fault conditions as the high-speed bypass contacts being welded shut.

A further object is to provide such an improved chopper motor-controller which may alternatively be arranged to permit the operator to keep the foot pedal accelerator depressed when reversing direction and still prevents the truck from running out of control under fault conditions.

DESCRIPTION OF THE DRAWINGS

These and other objects and advantages of the invention will be more readily apparent from the following detailed description when considered in conjunction with the accompanying drawing wherein.

SUMMARY OF THE INVENTION

Figure 1:
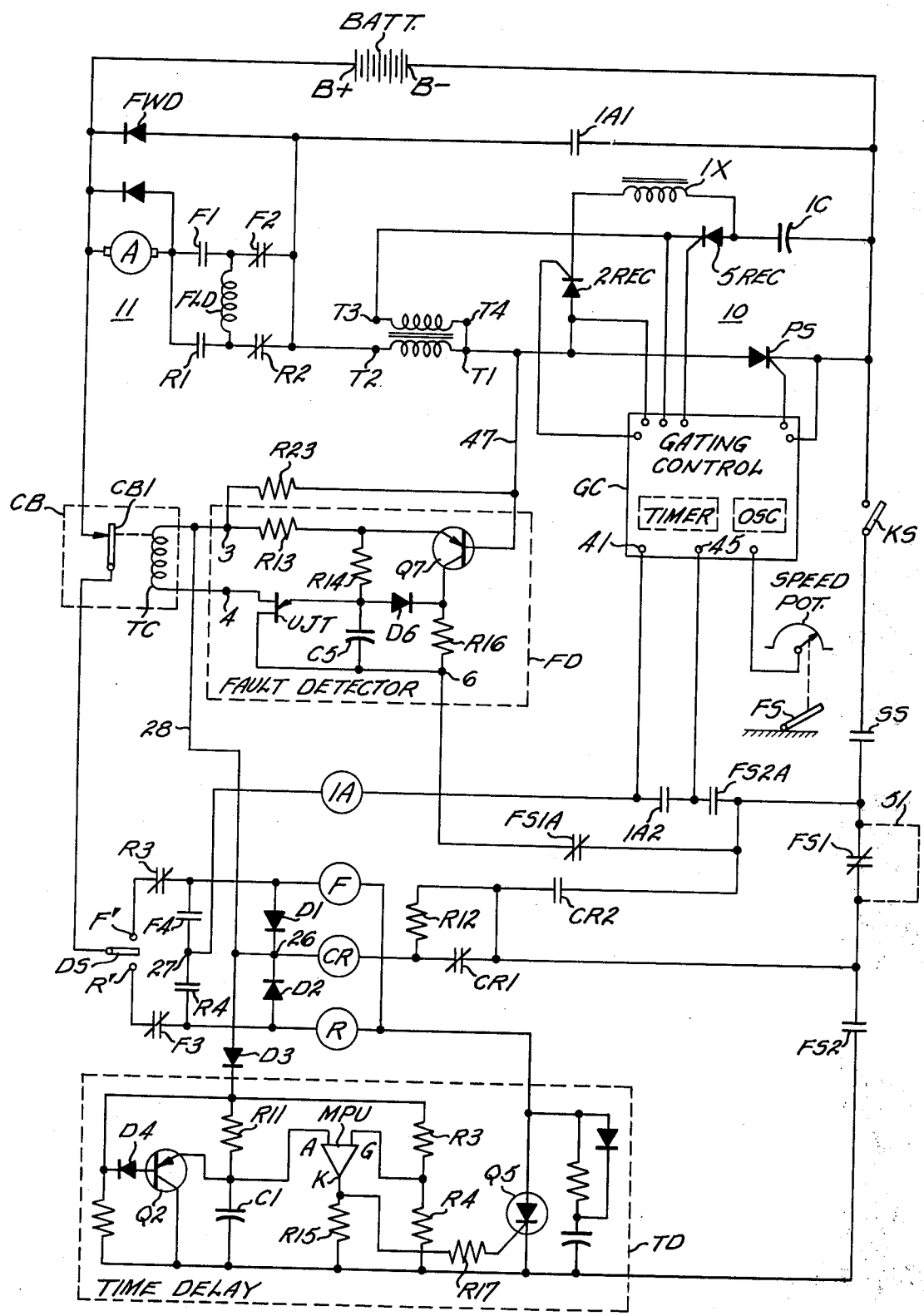
FIG. 1 is a schematic circuit diagram of a chopper motor-controller for a lift truck embodying the invention and which is connected to require the truck operator to relax the foot pedal when starting and when changing direction, but which can alternatively be connected, by adding a jumper shown in dotted lines, to permit the operator to reverse direction while the foot pedal is depressed.

The speed of a truck driven by a DC motor is regulated by a chopper motor-controller having a rapid-acting, load current carrying semiconductor power switch and a speed potentiometer controlled by a foot pedal accelerator to vary the average current supplied by the power switch to the motor; forward and reverse directional contactors for controlling the polarity of the motor field winding and thus the direction of truck travel; a high speed contactor having bypass contacts in shunt to the power switch to provide maximum motor speed; a manual direction switch for selectively operating the forward contactor or the reverse contactor; fault detecting means which senses faults that may cause the truck to run out of control, such as the bypass contacts being welded closed, and removes power from the controller in response thereto; a high speed switch operated by depression of the foot pedal to adjacent its maximum speed position to both operate the high-speed contactor and inactivate the fault detecting means; and time delay means which prevents a directional contactor from closing in on a fault (that might cause the truck to run out of control) before the fault detecting means can operate to disable the controller. The controller may have means including a normally closed foot pedal switch in series with the directional contactor coils which prevents operation of a directional contactor unless the foot pedal accelerator is relaxed, thereby preventing jolts or jerks upon starting or changing truck direction, or alternatively the normally closed foot pedal switch may be bypassed to permit the truck operator to reverse direction while the foot pedal accelerator is depressed, since in either arrangement the time delay means prevents a directional contact from picking up before the fault detecting means can operate to remove power from the controller in the event of a fault.

DETAILED DESCRIPTION

Referring to the drawing, a forced commutation chopper motor-controller 10 selectively controls the speed of a DC traction series motor 11 having an armature A and a field winding FLD which drives a lift truck (not shown) by selectively varying the frequency of current pulses periodically supplied thereto from a battery BATT through a load current carrying semiconductor controlled rectifier (SCR) power switch PS, thereby selectively controlling the average power supplied to the motor 11 and the speed of the lift truck. Armature A and field winding FLD may be connected in series with power switch PS and the primary winding T2-T1 of a transformer across the terminals B+, B− of battery BATT through the normally open contacts F1 of a "forward" directional contactor F and the normally closed contacts R2 of a "reverse" directional contactor R to drive the lift truck in the forward direction, or may alternatively be connected through the normally open contacts R1 of the reverse contactor and the normally closed contacts F2 of the forward contactor to propel the lift truck to the rear. A free wheeling diode FWD in shunt to the series arrangement of motor armature A and field winding FLD provides a path for inductive motor current during the interpulse period when power switch PS is open. The contactors, such as F and R, and the relays such as CR are given the same reference characters herein as their operating coils.

The frequency of current pulses supplied by power switch PS to motor 11 may be selectively regulated by a gating control GC shown in block form which applies gating pulses to the gate of power switch PS. Gating control GC may include a relaxation oscillation OSC (shown in block form) which generates the gating pulses and the frequency of which is selectively controlled by the setting of a potentiometer SPEED POT whose wiper is controlled by a foot pedal accelerator FS on the lift truck. The series arrangement of a commutation capacitor 1C, an auxiliary thyristor 5 REC, and the transformer secondary winding T3-T4 may be connected in shunt to power switch PS. One side of an inductor 1X may be coupled to the junction between 5 REC and the commutation capacitor 1C, and the other side of inductor 1X may be connected to the cathode of a commutation thyristor 2 REC whose anode is coupled to the junction between transformer primary T2-T1 and the anode of power switch PS.

The duration of current pulses supplied by power switch PS is controlled by the time interval between each "on" gating pulse applied by gating control GC to power switch PS and the "off" gating pulse subsequently applied to commutation SCR 2 REC to turn off the power switch. Although the duration of current pulses supplied by power switch PS to the motor 11 is fixed in the disclosed embodiment, it will be appreciated that gating control GC may, if desired, selectively control the width of the current pulses by varying the time delay between the gating pulses applied to power switch PS and to commutation SCR 2 REC.

The illustrated chopper is popularly known as the "Jones" Class D forced commutation chopper wherein a commutation capacitor is switched by an auxiliary SCR, i.e., 2 REC. Under normal operating conditions a gating pulse is applied to power switch PS each time relaxation oscillator OSC generates an output pulse, thereby turning on PS. Assuming forward contactor F is operated, a current pulse is applied from battery BATT to the motor 11 when power switch PS conducts in a circuit which may be traced from positive battery terminal B+, armature A, forward contactor contacts F1, field winding FLD, reverse contactor contacts R2, transformer primary T2-T1, and the anode-cathode circuit of power switch PS to negative battery terminal B−. The increase in magnitude of current flowing in transformer primary winding T2-T1 induces a voltage in secondary winding T4-T3 of such polarity that T3 is driven negative. The gate of auxiliary SCR 5 REC may be referenced to ground in gating control GC, and the negative potential at T3 is applied to the cathode of 5 REC to, in effect, supply a gating signal to 5 REC to turn it on. Conduction by 5 REC results in charging of commutation capacitor 1C from the potential induced in transformer secondary winding T3-T4 of a polarity tending to forward bias 2 REC and to reverse bias power switch PS. After commutation capacitor 1C is charged, the current flow through 5 REC falls below its hold-in current and it turns off. When the current through 5 REC and winding T3-T4 decays to zero, the magnetic field of the transformer collapses and induces a voltage in secondary winding T3-T4 which drives T3 positive. The positive polarity of voltage at terminal T3 may be "steered" by gating control GC to the gate of commutation capacitor 2 REC to turn it on and thus initiate the commutation cycle.

Commutation of power switch PS is initiated when commutation capacitor 1C starts to conduct load current from power switch PS in a path through 1X and 1C at a rate delayed by the inductance of choke 1X. The current transferred from commutation capacitor 1C in the loop through power switch PS is opposed in polarity to the load current flowing through power switch PS and commutates the power switch off if the resultant current through power switch PS is less than its hold-in current for the required recovery period. Commutation capacitor 1C now overcharges from the energy stored in inductive motor winding FLD to a voltage of a polarity which tends to reverse bias commutation SCR 2 REC and turn it off.

Normal operation of the controller will repeat at a duty cycle controlled by the position of foot pedal FS and thus the setting of potentiometer SPEED POT which regulates the relaxation oscillator frequency at which "on" gating pulses are supplied by the gating control GC to power switch PS. Slight depression of the foot pedal FS opens a pair of normally closed contacts FS1 and closes a pair of normally open contacts FS2, while full depression of the foot pedal FS opens a pair of normally closed contacts FS1A and closes a pair of normally open contacts FS2A, whose function is described hereinafter.

The direction of travel of the lift truck is controlled by a manualy operated double throw direction selector switch DS adapted to engage a stationary contact F' to drive the lift truck forward or to alternatively engage a stationary contact R' to propel the truck to the rear. The movable contact of direction switch DS is connected to the positive terminal B+ of battery BATT through the normally closed contacts CB1 of a circuit breaker CB (shown in block form), and direction switch DS disengages both stationary contacts F' and R' when activated to its neutral position between the forward and reverse positions. Stationary contact F' is connected through normally closed reverse interlock contacts R3 and a diode D1 to a junction point 26 and is also connected through R3 and normally open forward interlock contacts F4 to a junction point 27. Stationary contact R' is connected through normally closed forward interlock contacts F3 and a diode D2 to junction point 26 and is also connected through F3 and normally open reverse interlock contacts R4 to junction point 27. The forward and reverse interlock contacts F3, F4 and R3, R4 are mounted respectively on the forward contactor F and on the reverse contactor R and are operated whenever the corresponding directional contactor opens and closes. A time delay circuit TD is connected to the positive terminal B+ of battery BATT through junction point 26 whenever direction selector switch DS is actuated into engagement with F' or R'. Time delay circuit TD prevents the forward or reverse directional contactor from picking up for a tiime delay greater than that required for a fault detecting means FD (described hereinafter) to operate and thus positively prevents operation of a directional contactor under fault conditions which might cause the truck to lurch or run uncontrolled, as described hereinafter.

OPERATION WITH SAFETY SEQUENCE

If the truck operator has turned on the ignition key switch KS and is sitting on the truck seat to close seat switch SS, the coil CR of a control relay will be energized when direction switch DS is actuated to the forward or reverse position if the foot pedal accelerator FS is relaxed. One such circuit may be traced from B+, CB1, DS, F', R3, D1, CR, control relay normally closed contacts CR1, FS1, SS and KS to B—. Consequently, control relay CR operates whenever direction switch DS is actuated from its neutral position and foot pedal FS is relaxed (disengaged). When control relay CR operates, it opens CR1 to disable its initial energizing circuit and closes its normally open contacts CR2 to complete a locking circuit wherein coil CR is connected to battery terminal B— through a resistance R12, CR2, SS and KS to B—, thus holding the control relay operated when foot pedal FS is depressed.

Control relay coil CR will not be energized if foot pedal FS is depressed (and opens FS1) at the time direction switch DS is actuated. Further, if direction switch DS is returned to its neutral position at any time control relay CR is operated and foot pedal FS is depressed, the circuit from B+ to coil CR is opened at DS so control relay CR releases and opens its locking circuit through CR2. Control relay coil CR cannot be energized again until the accelerator pedal FS is relaxed, i.e., allowed to return to the up position, so that contacts FS1 again close to complete the circuit between one side of coil CR and B—. This arrangement requires that the lift truck operator always relax the foot pedal accelerator FS when selecting a direction of travel upon starting and also when changing the direction of truck travel. When accelerator foot pedal FS is released, the speed potentiometer SPEED POT is automatically returned to a position wherein minimum current is supplied to motor 11, thereby preventing jolts and jerking upon starting or when the direction of the truck is reversed and minimizing damage to motor 11 and to the load on the lift truck.

Assuming that direction switch DS is in the forward position, slight depression of accelerator foot pedal FS closes contacts FS2 and prepares an energizing circuit for the forward contactor coil F, which circuit is completed after a time delay of approximately 0.3 seconds provided by time delay circuit TD. Time delay circuit TD is connected to positive battery B+ when direction switch DS is actuated into engagement with F' to connect B+ to point 26, and time delay circuit TD is connected to negative battery B— and is activated when foot pedal FS is subsequently depressed to close FS2. When activated, time delay circuit TD triggers a thyristor Q5 after such 0.3 second time delay to complete an energizing circuit for forward contactor coil F, which circuit may be traced from B+, CB1, DS, F', R3, coil F, the anode-cathode circuit of Q5, FS2, CR2, SS, and KS to B—. The time delay provided by circuit TD prevents the forward or reverse directional contactor F or R from operating under fault conditions, such as the full speed bypass contacts 1A being welded shut, before the fault detecting means is enabled and which might cause the lift truck to lurch and run out of control, as discussed hereinafter.

The high impedance of disabled thyristor Q5 acts as a normally open switch for a predetermined interval and, when triggered into conduction, acts as a closed switch. The time delay before Q5 is triggered assures that fault detecting means FD (described hereinafter) is energized and can operate to trip circuit breaker CB in the event of a fault before the directional contactor F or R picks up, i.e., operates.

Actuation of direction switch DS, for example, to the forward position, connects the positive B+ side of battery BATT to junction 26 and initiates charging of a capacitor C1 through a diode D3 in series with a resistance R11 when the operator depresses foot pedal FS to close FS2. Positive battery B+ is connected simultaneously to time delay circuit TD, to fault detector circuit FD, and to control relay coil CR. Resistance R11 and capacitor C1 provide an RC time delay of approximately 0.3 seconds after FS2 closes before Q5 is triggered. The voltage built up across capacitor C1 is applied to the anode of a programmable unijunction transistor MPU and triggers it into conduction after a time delay of approximately 300 milliseconds when the voltage across C1 reaches a predetermined value. The resulting flow of current through a resistance R15 connected to the cathode of MPU develops a voltage which is applied through a resistance R17 to the gate of thyristor Q5 and triggers it on. Conduction by Q5 connects one side of coil F through FS2, CR2, seat switch SS and key switch KS to the negative side B— of battery BATT, thereby energizing forward contactor coil F after a time delay of approximately 300 milliseconds subsequent to the closing of foot switch contacts FS2. If accelerator pedal FS is depressed when direction switch DS is actuated, contacts FS1 will be open and contactor coil F will not be energized until the foot pedal FS is relaxed to close its contacts FS1 so that control relay CR can operate and foot pedal FS is again depressed to close FS2.

The setting of foot pedal FS controls the wiper of potentiometer SPEED POT and thus regulates the average motor current supplied to motor 11 and its speed. If the foot pedal accelerator FS is depressed to adjacent its maximum speed position, its contacts FS2A close to energize the coil 1A of the full speed bypass contactor and its contacts FS1A open to disable the fault detector FD. The energizing circuit to coil 1A is through a TIMER shown in block form in gating control GC, which TIMER provides a time delay of approximately 1.5 seconds before the energizing circuit to coil 1A is completed. Such time delay allows the lift truck to accelerate through the power switch range before coil 1A is energized, and such energizing circuit for 1A may be traced from B+, CB1, DS, F', R3, F4, 27, coil 1A, terminal 41 of gating control GC, the TIMER (shown in block form), terminal 45 of gating control GC, FS2A, seat switch SS and key switch KS to B−. The full speed bypass contactor 1A then operates to close its bypass 1A1 contacts which are in shunt to power switch PS so that the motor power circuit is from B+, armature A, F1, field winding FLD, R2, and 1A1 to B−, thereby causing motor 11 to run at full speed and provide maximum torque. Operation of the full speed bypass contactor 1A also closes its contacts 1A2 to complete a locking circuit to coil 1A.

The circuit to high speed contactor coil 1A is opened when the operator relaxes foot pedal FS to thereby open contacts FS2A, but the full speed bypass contactor may fail to release if its bypass contacts 1A1 are welded shut. Relaxing of foot pedal accelerator FS will also reclose contacts FS1A to connect fault detector FD to B− through seat switch SS and key switch KS, thereby activating fault detector FD and permitting it to trip circuit breaker CB in the event contacts 1A1 are welded shut.

FAULT DETECTING MEANS

Operation of the fault detecting means FD in the event of a fault energizes the trip coil TC of circuit breaker CB to open its normally closed contacts CB1 and thus open the circuit between positive battery B+ and direction switch DS, thereby removing power from the controller and causing the directional contactor F or R to release. Release of the directional contactor disables oscillator OSC in gating control GC and thus stops the gating pulses which turn power switch PS on and off.

Fault detecting means FD turns off oscillator OSC and removes power from the controller under two types of fault conditions: (1) when the high speed contactor bypass contacts 1A1 fail to open, and (2) when power switch PS conducts continuously. The circuit shown in the drawing for fault detecting means FD is schematic only and is not intended to illustrate a fully operable device. As described hereinbefore, when foot pedal FS is fully depressed, its FS1A contacts are opened to disconnect the fault detecting means FD from B−, and also its FS2A contacts are closed to energize high speed contactor coil 1A so that motor 11 runs at full speed. Reversal of direction switch DS by the truck operator when foot pedal FS is still fully depressed will not reverse motor 11, but rather will release control relay CR and the directional contactor F or R and inactivate time delay circuit TD when DS reaches its neutral position between F' and R'. The controller will then only drive the motor 11 in the opposite direction when the operator relaxes foot pedal FS to thereby close FS1 and permit the control relay CR to again operate and the newly selected directional contactor F or R to operate after the time delay provided by circuit TD.

When the operator relaxes foot pedal FS from its fully depressed condition before reversing direction switch DS, contacts FS1A close to connect negative battery B− to terminal 6 of fault detector FD and activate it, and contacts FS2A open and deenergize coil 1A so bypass contacts 1A1 open. If bypass contacts 1A1 in shunt to power switch PS fail to open, fault detector FD operates after a 0.1 second delay to trip circuit breaker CB and thus remove power from the controller. Negative battery B− is connected through "shorted" bypass contacts 1A1, transformer winding T2-T1 and lead 47 to the base of a PNP transistor Q7 and turns it on. Under nonfault conditions a diode D6 of fault detector FD is forward biased and prevents charging of a timing capacitor C5. Positive battery B+ is applied through direction switch DS, point 26, lead 28, and two series resistances R13, R14 to the anode of diode D6 so that D6 is forward biased and conducts. The series arrangement of conducting diode D6 and a resistance R16 is in shunt to timing capacitor C5 and prevents charging thereof. Under fault conditions such as bypass contacts 1A1 failing to open, negative battery B− through 1A1 and lead 47 turns on PNP transistor Q7 which then conducts to reverse bias D6 and turn it off, thereby removing the short circuit from C5 which begins to charge from positive battery B+ through a resistance R14. After a time delay of approximately 0.1 seconds, the voltage across C5 attains a predetermined value and is applied to the emitter of a unijunction transistor UJT and triggers it into conduction. Unijunction transistor UJT is in series with the trip coil TC of circuit breaker CB, and conduction by UJT operates circuit breaker CB to open its contacts CB1, thereby disconnecting positive battery B+ from the control circuit and releasing directional contactor F or R.

If an energizing circuit were completed to a directional contactor coil F or R simultaneously with connection of positive battery B+ to fault detecting means F (which occurs when DS is activated into engagement with F') under the condition that bypass contacts 1A1 were welded shut, the directional contactor F might close in on a fault before fault detector FD operated to remove power from the control. If this happened, contacts F1 would be connected in series with armature A and field winding FLD and welded contacts bypass 1A1 directly across battery terminals B+ and B−, thereby causing excessive current to flow through the contacts F1 of forward contactor F and causing the lift truck to lurch and run uncontrolled. Time delay circuit TD prevents this from happening.

Upon initial starting of the truck, actuation of direction switch DS connects B+ through junction point 26: (1) over lead 28 to fault detector FD; (2) to one side of coil CR so control relay operates (if foot pedal FS is relaxed); and (3) through diode D3 to time delay circuit TD. No current is applied to power switch PS until the directional contactor such as F, operates to close F1, but B+ over lead 28 is connected through a resistance R23 to the anode of power switch PS so that sensing current is provided to the fault detector FD at this time to permit the fault detector to trip circuit breaker CB (after a 0.1 second time delay) if high speed bypass contacts 1A1 are welded shut. The time delay circuit TD is only enabled when foot pedal FS is depressed (subsequent to actuation of direction switch DS) to close contacts FS2, and time delay circuit TD only triggers thyristor Q5 to complete an energizing circuit to the directional contactor coil F (or R) after a time delay of 0.3 seconds subsequent to the closing of contacts FS2. It will thus be appreciated that the disclosed control circuit positively prevents a directional contactor from closing in on a fault which could cause the truck to lurch or run out of control.

If the operator reverses the direction switch DS while foot pedal FS is depressed, positive battery B+ is removed (when DS reaches the neutral position) from directional contactor coil F (or R), the control relay coil CR, and the time delay circuit TD, all of which release and cannot be enabled again until the operator relaxes the foot pedal FS.

Under normal running conditions positive battery B+ applied to time delay circuit TD through diode D3 reverse biases a diode D4 so that a transistor Q2 is turned off. Removal of B+ (when direction switch DS is actuted to its neutral position) forward biases diode D4. The voltage across timing capacitor C1 then turns on transistor Q2 which conducts to discharge the timing capacitor C1, thereby assuring that a 0.3 time delay will occur before Q5 is triggered into conduction to permit the directional contactor F or R to operate. This arrangement insures that the fault detector FD can trip circuit breaker CB to disable the control, in the event that high speed bypass contacts 1A1 fail to open, before a directional contactor is operated, thereby preventing the truck from lurching or running out of control under fault conditions.

OPERATION WITHOUT SAFETY SEQUENCE

Some lift truck owners desire the capability of reversing the truck when the foot pedal FS is depressed, i.e., without requiring the operator to release the foot pedal accelerator FS. A jumper 51 shown in dotted lines is connected around foot pedal contacts FS1 to accomplish such mode of operation. Such jumper connection defeats the operation of control relay CR and its contacts CR1 and CR2. The control relay CR and foot switch contacts FS1 may be eliminated when conductor 51 is utilized.

Assuming jumper 51 is connected, if the operator reverses direction switch DS when foot pedal accelerator FS is depressed, positive battery B+is removed from the directional contactor coil F (or R) and from the time delay circuit TD, thereby causing F (or R) to release and inactivating the time delay circuit TD. Removing B+ from time delay circuit TD forward biases diode D4 and turns on transistor Q2 to discharge timing capacitor C1. The newly selected directional contactor F (or R) is then operated after the 0.3 second RC time delay provided by R11 and C1.

If the operator releases foot pedal FS from its high speed condition while direction switch DS is still actuated, contacts FS2 open to disable the time delay circuit TD and release the directional contactor F (or R) and also contacts FS2A open to release contactor 1A and FS1A close to enable the fault detector FD. Since time delay circuit TD provides a 0.3 second time delay before the directional contactor F (or R) can operate again, the fault detector FD can respond, in the event that high speed bypass contacts 1A1 are welded shut, before the directional contactor F (or R) picks up and thus prevents the truck from lurching or running out of control.

Figure 2:
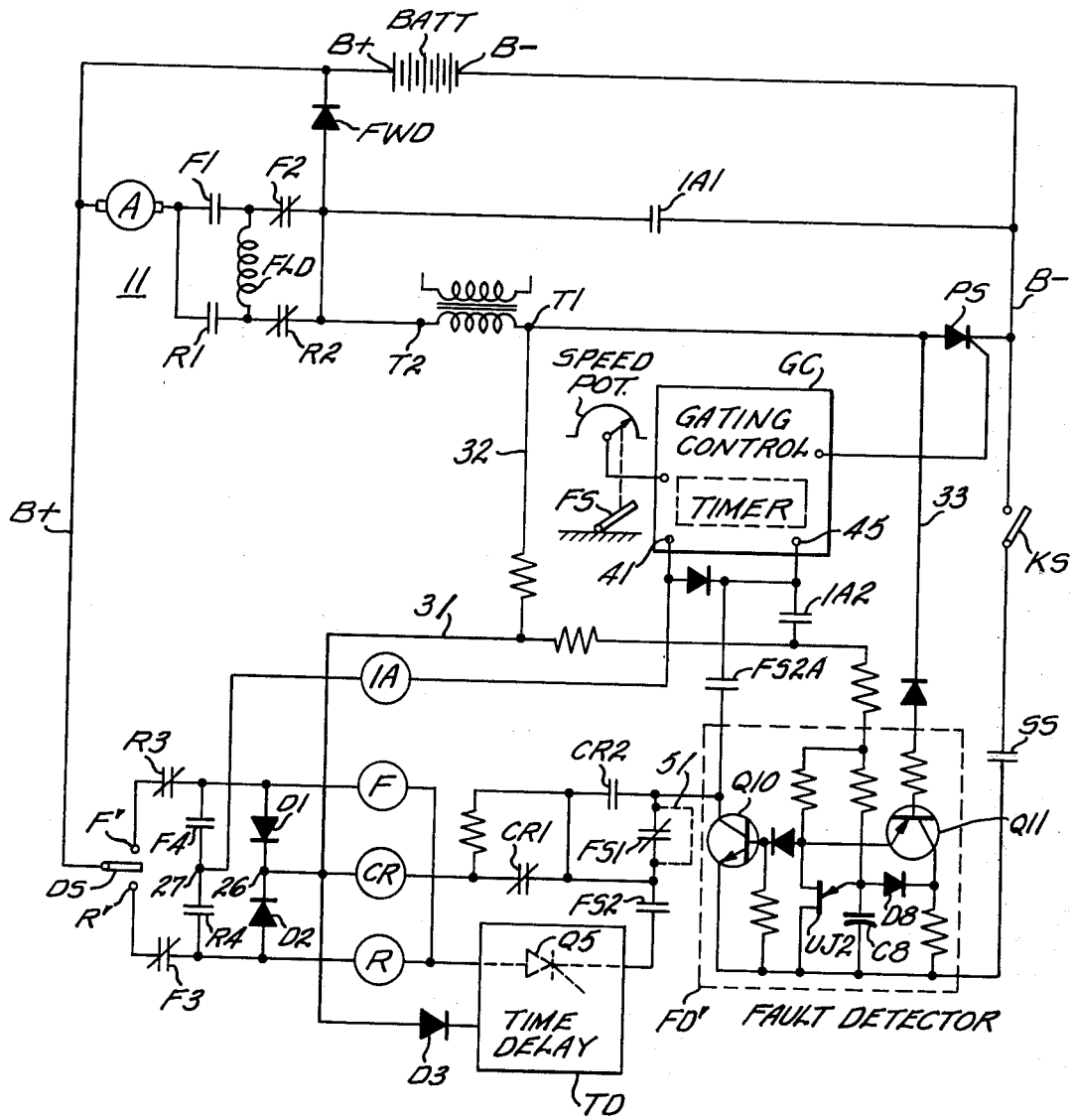
FIG. 2 is a partial circuit diagram similar to FIG. 1 but showing alternative fault detecting means of the solid state type.

FIG. 2 illustrates an alternative embodiment wherein the fault detector and electromagnetic circuit breaker of the FIG. 1 arrangement with contacts in the positive battery lead B+ to disable the controller is replaced by alternative fault detecting means FD' having the emitter-collector circuit of a semiconductor switch Q10 between the negative battery lead B− and the directional contactors F and R to disable the motor controller when the switch Q10 is turned off as a consequence of a fault. The time delay means TD is shown in block form between the directional contactor coils and the normally open foot switch contacts FS2. Time delay TD, when activated, triggers a thyristor Q5 (shown in dotted lines) into conduction after a 0.3 second time delay, as described hereinbefore.

When foot pedal FS is relaxed and direction switch DS is actuated into engagement with F', an energizing circuit for control relay CR is completed which may be traced from B+, DS, F', R3, D1, 26, CR, CR1, FS1, collector-emitter circuit of transistor switch Q10, SS and KS to B−. Control relay CR then closes its CR2 contacts, and when foot pedal FS is subsequently depressed to open FS1 and close FS2, time delay TD turns on Q5 after 0.3 second delay to complete an energizing circuit to forward contact F which may be traced from B+, DS, F', R3, F, Q5, FS2, CR2, Q10, SS and KS to B−. This illustrated embodiment requires that foot pedal accelerator FS be relaxed upon starting and when changing the direction of truck travel, as discussed hereinbefore but, alternatively, addition of jumper conductor 51 (shown in dotted lines) in shunt to foot pedal contacts FS1 permits starting and reversal of direction while foot pedal FS is depressed. In embodiments wherein conductor 51 is utilized, control relay CR and foot switch contacts FS1 may be eliminated.

Positive battery B+ is connected to fault detecting means FD' over lead 31 to activate it when direction switch DS is actuated into engagement with F' or R', thereby turning on transistor switch Q10 to prepare the circuit for operation of time delay TD when foot pedal contacts FS2 are subsequently closed. Actuation of direction switch DS also connects sensing current over lead 32 to the anode of power switch PS to permit fault detector FD' to response to a fault by turning off transistor switch Q10 and thereby disable the controller before a directional contactor F or R can operate.

If foot pedal FS is depressed to adjacent its maximum speed position to close foot pedal contacts FS2A, negative battery B− is coupled to terminal 41 of gating control GC after a time delay by the Timer, thereby completing an energizing circuit to high speed contactor coil 1A which operates to close its high speed bypass contacts 1A1 and causing motor 11 to run at full speed. High speed contactor 1A also closes its contacts 1A2 in series with FS2A to, in effect, shunt positive battery B+ away from fault detector FD', thereby deactivating it and not permitting it to operate and disable the controller, in response to battery negative B− at the anode of power switch PS.

The fault detecting means FD' shown in FIG. 2 is schematic only and is not intended to illustrate a commercially feasible circuit. The anode of power switch PS is coupled over a lead 33 to the base of a PNP transistor Q11 which is reverse biased and turned off under nonfault conditions when power switch PS is pulsing normally. When Q11 is turned off, a diode D8 connected to its collector is forward biased and short circuits a capacitor C8.

In the event of a fault such as the full speed bypass contacts 1A1 being welded shut or power switch PS conducting continuously, negative battery B— is coupled over lead 33 to the base of PNP transistor Q11 to turn it on. Conduction by Q11 reverse biases D8 and permits charging current to flow into capacitor C8. If the fault does not clear up within approximately 0.1 seconds, the voltage across C8 builds up to a predetermined magnitude which triggers a unijunction transistor UJ2 into conduction. Conduction by UJ2 couples the base of NPN transistor switch Q10 to negative battery B— and turns Q10 off, thereby inserting the high impedance of the emitter-collector circuit of Q10 between the directional contactor coil F or R and negative battery B— and preventing a directional contactor from closing in on the fault.

While only two embodiments of our invention have been illustrated and described, it should be understood that we do not intend to be limited to the two embodiments for many modifications and variations thereof will be obvious to those skilled in the art.

The embodiments of the invention in which an exclusive property or privilege is claimed are defined as follows:

1. In a vehicle driven by a reversible electric motor provided with a field winding and having a chopper controller for regulating the speed of said motor including a load current carrying semiconductor power switch in series with said motor and being switchable periodically from a nonconductive state to a conductive state and also including means controlled by a speed regulating member on said vehicle for selectively varying the average load current to said motor carried by said power switch;

forward and reverse directional contactors adapted when operated to connect said field winding in a direction so as to rotate said motor in the forward and reverse directions respectively, a high speed contactor having a pair of normally open bypass contacts in shunt to said power switch, whereby said motor runs at full speed when said high speed contactor is operated, means including a direction switch having forward and reverse positions for selectively completing energizing circuits to said forward and to said reverse contactors respectively and also having a neutral position between said forward and reverse positions in which both of said directional contactors are released, time delay means in series with said direction switch and said forward and reverse contactors responsive to actuation of said direction switch to said forward position or to said reverse position for completing an energizing circuit to the selected directional contactor after a first predetermined time interval, fault detection means for sensing closure of said bypass contacts for a second predetermined time interval, which is less than said first predetermined interval, and for disabling said chopper controller in response thereto, means responsive to operation of said speed regulating member to adjacent its maximum speed position for disabling said fault detecting means and for operating said high speed contactor, said time delay means being set to its initial condition and said fault detection means being disabled when said direction switch is in said neutral position and said fault detection means being enabled when said direction switch is operated to either said forward position or to said reverse position, and sequence-of-operation controlling means for preventing operation of either directional contactor if said speed regulating member is away from its minimum speed position at the instant said direction switch is actuated from said neutral position to either said forward position or to said reverse position and wherein said sequence-of-operation controlling means includes a pair of normally closed contacts connected in said directional contactor energizing circuits and which are opened when said speed regulating member is away from its minimum speed position and prevent subsequent operation of either directional contactor, in response to actuation of said direction switch between said forward and reverse positions, until said speed regulating member is at its minimum speed position, and wherein said sequence-of-operation controlling means also includes a pair of contacts in series with said time delay means and said directional contactors which contacts are open when said speed regulating member is at its minimum speed position and are closed to complete said directional contactor energizing circuits when said speed regulating member is partially operated.

2. In a vehicle driven by a reversible electric motor provided with a field winding and having means including a triggerable load current carrying semiconductor power switch in series with said motor and being switchable periodically between a nonconductive state and a conductive state and also having means including a foot pedal on said vehicle for selectively varying the average load current supplied by said power switch to said motor to thereby control the speed thereof, forward and reverse directional contactors arranged when operated to connect said field winding in a direction to rotate said motor in the forward and in the reverse direction respectively, a high speed contactor having a pair of normally open bypass contacts in shunt to said power switch, whereby said motor runs at full speed when said high speed contactor is operated, direction switch means having forward and reverse positions for selectively operating said forward and reverse contactors respectively and also having a neutral position therebetween in which both of said directional contactors are released, time delay means in series with said direction switch means and said directional contactors responsive to actuation of said direction switch means to said forward position or to said reverse position for completing an energizing circuit to the selected directional contactor after a first predetermined time interval, fault sensing means for detecting either when said bypass contacts are closed for a second predetermined time interval, which is less than said first predetermined interval, or when said power switch fails to pulse for said second predetermined interval, and for removing electrical power from said directional contactors in response thereto, means responsive to operation of either of said directional contactors for applying a train of triggering pulses to said power switch, switch means responsive to depression of said foot pedal to adjacent its maximum speed position for disabling said fault detecting means and said triggering pulse applying means and for operating said high speed contactor, said fault sensing means being disabled and said time delay means being reset when said direction switch means is in said neutral position and being enabled when said direction switch means is operated to said forward position or to said reverse position, and sequence-of-operation controlling means including a pair of normally closed foot switch contacts controlled by said foot pedal and connected in series with the operating coils of both said directional contactors for preventing operation of either directional contactor when said foot pedal is depressed at the instant said direction switch means is actuated from said neutral position to either said forward position or to said reverse position, and wherein said sequence-of-operation controlling means also includes a pair of normally open foot switch contacts controlled by said foot pedal and arranged in series relation with said normally closed foot switch contacts and also with the operating coils of both said directional contactors, and a control relay having a operating coil, a pair of normally closed contacts in series with said operating coil and said normally closed foot switch contacts and a pair of normally open contacts in shunt to said normally closed foot switch contacts.

3. In combination with a vehicle driven by an electric motor and having a chopper controller for regulating motor speed including a semiconductor power switch in series with said motor and means controlled by a foot pedal for selectively varying the average current supplied by said power switch to said motor, forward and reverse directional contactors adapted when operated to connect said motor to rotate in the forward and in the reverse directions respectively, direction switch means having forward and reverse positions for selectively completing energizing circuits to said forward and to said reverse directional contactors respectively, time delay means in series with said direction switch means and said directional contactors responsive to actuation of said direction switch means to said forward position or to said reverse position to complete an energizing circuit to the selected directional contactor after a first predetermined time delay, a high speed contactor having a pair of normally open bypass contacts in shunt to said power switch, fault detecting means for sensing closure of said bypass contacts and for disabling said chopper controller in response thereto, said fault detecting means being enabled upon actuation of said direction switch means to said forward position or to said reverse position, said direction switch means having a neutral position between said forward position and said reverse position in which said directional contactor energizing circuits are open and said time delay means is set to its initial condition and said fault detecting means is disabled, means responsive to depression of said foot pedal to adjacent its full speed position for operating said high speed contactor and for disabling said fault detecting means, whereby said directional contactors cannot close in on a fault which might cause said vehicle to run out of control before said fault detecting means disables said chopper controller, and sequence-of-operation controlling means including a switch operated by said foot pedal and having a pair of normally closed contacts connected in said energizing circuits to said directional contactors for preventing operation of said directional contactors if said foot pedal is depressed when said direction switch means is actuated from said neutral position to said forward position or to said reverse position, and wherein said switch also has a pair of normally open contacts (FS2) connected in said directional contactor energizing circuits in series with said time delay means (TD) and with said pair of normally closed contacts (FS1), and wherein said sequence-of-operation controlling means also includes control relay means (CR) responsive to operation of said direction switch means (DS) to said forward position (F') or to said reverse position (R') at a time when said normally closed contacts (FS1) are engaged for completing an electrical path (CR2) in shunt to said pair of normally closed contacts (FS1), whereby said control relay means (CR) cannot be operated unless said foot pedal (FS) is relaxed and said directional contactors cannot operate until said control relay means (CR) is operated and said foot pedal (FS) is subsequently depressed to close said pair of normally open contacts (FS2).

4. In combination with a vehicle driven by an electric motor and having a chopper controller for regulating motor speed including a semiconductor power switch in series with said motor and means controlled by a foot pedal for selectively varying the average current supplied by said power switch to said motor, forward and reverse directional contactors adapted when operated to connect said motor to rotate in the forward and in the reverse directions respectively, direction switch means having forward and reverse positions for selectively completing energizing circuits to said forward and to said reverse directional contactors respectively, time delay means in series with said direction switch means and said directional contactors responsive to actuation of said direction switch means to said forward position or to said reverse position to complete an energizing circuit to the selected directional contactor after a first predetermined time delay, a high speed contactor having a pair of normally open bypass contacts in shunt to said power switch, fault detecting means for sensing closure of said bypass contacts and for disabling said chopper controller in response thereto, said fault detecting means being enabled upon actuation of said direction switch means to said forward position or to said reverse position, said direction switch means having a neutral position between said forward position and said reverse position in which said directional contactor energizing circuits are open and said time delay means is set to its initial condition and said fault detecting means is disabled, means responsive to depression of said foot pedal to adjacent its full speed position for operating said high speed contactor and for disabling said fault detecting means, whereby said directional contactors cannot close in on a fault which might cause said vehicle to run out of control before said fault detecting means disables said chopper controller, and sequence-of-operation controlling means including a switch operated by said foot pedal and having a pair of normally closed contacts connected in said energizing circuits to said directional contactors for preventing operation of said directional contactors if said foot pedal is depressed when said direction switch means is actuated from said neutral position to said forward position or to said reverse position, and wherein said direction switch means is adapted, when a low impedance (S1) is connected in shunt to said pair of normally closed contacts (FS1), to release one directional contactor and operate the other, even though said foot pedal (FS) is depressed, when said direction switch means (DS) is operated between said forward (F') and reverse (R') positions.

5. In the combination of claim 4 wherein said switch also has a pair of normally open contacts (FS2) connected in said directional contactor energizing circuits in series with said time delay means (TD) and said pair of normally closed contacts (FS1), whereby relaxation of said foot pedal (FS) from said high speed position when said pair of normally closed contacts (FS1) have said low impedance shunt (S1) will reset said time delay means (TD) and release said directional contactor and permit said fault detecting means (FD) to operate if said bypass contacts (1A1) are shorted.

6. In a vehicle driven by a reversible electric motor provided with a field winding and having a chopper controller for regulating the speed of said motor including a load current carrying semiconductor power switch in series with said motor and being switchable periodically from a nonconductive state to a conductive state and also including means controlled by a speed regulating member on said vehicle for selectively varying the average load current to said motor carried by said power switch;

forward and reverse directional contactors adapted when operated to connect said field winding in a direction so as to rotate said motor in the forward and reverse directions respectively, a high speed contactor having a pair of normally open bypass contacts in shunt to said power switch, whereby said motor runs at full speed when said high speed contactor is operated, means including a direction switch having forward and reverse positions for selectively completing energizing circuits to said forward and to said reverse contactors respectively and also having a neutral position between said forward and reverse positions in which both of said directional contactors are released, time delay means in series with said direction switch and said forward and reverse contactors responsive to actuation of said direction switch to said forward position or to said reverse position for completing an energizing circuit to the selected directional contactor after a first pedetermined time interval, fault detection means for sensing closure of said bypass contacts for a second predetermined time interval, which is less than said first predetermined interval, and for disabling said chopper controller in response thereto, means responsive to operation of said speed regulating member to adjacent its maximum speed position for disabling said fault detecting means and for operating said high speed contactor, said time delay means being set to its initial condition and said fault detection means being disabled when said direction switch is in said neutral position and said fault detection means being enabled when said direction switch is operated to either said forward position or to said reverse position, and sequence-of-operation controlling means for preventing operation of either directional contactor if said speed regulating member is away from its minimum speed position at the instant said direction switch is actuated from said neutral position to either said forward position or to said reverse position, said sequence-of-operation controlling means including a pair of normally closed contacts connected in said directional contactor energizing circuits and which are opened when said speed regulating member is away from its minimum speed position and prevent subsequent operation of either directional contactor, in response to actuation of said direction switch between said forward and reverse positions, until said speed regulating member is at its minimum speed position, and wherein said means for selectively completing energizing circuits to said forward and reverse contacts is adapted, when a low impedance is connected in shunt to said pair of normally closed contacts, to release one directional contactor and operate the other, even though said speed regulating member is away from said minimum speed position, when said direction switch is operated between said forward and reverse positions and through said neutral position.

* * * * *